US010114252B2

United States Patent
Qu

(10) Patent No.: US 10,114,252 B2
(45) Date of Patent: Oct. 30, 2018

(54) LIQUID CRYSTAL DISPLAY PANEL AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/141,226

(22) Filed: Apr. 28, 2016

(65) Prior Publication Data

US 2016/0377900 A1 Dec. 29, 2016

(30) Foreign Application Priority Data

Jun. 29, 2015 (CN) .......................... 2015 1 0369292

(51) Int. Cl.
*G02F 1/1339* (2006.01)
*G02F 1/1337* (2006.01)
*G02F 1/1335* (2006.01)

(52) U.S. Cl.
CPC ........ *G02F 1/13394* (2013.01); *G02F 1/1337* (2013.01); *G02F 1/133514* (2013.01); *G02F 2001/13398* (2013.01)

(58) Field of Classification Search
CPC .................................................. G02F 1/13394
See application file for complete search history.

(56) References Cited

U.S. PATENT DOCUMENTS

| 2003/0193640 A1* | 10/2003 | Park | G02F 1/13394 349/155 |
| 2013/0335691 A1* | 12/2013 | Wu | G02F 1/13394 349/155 |
| 2015/0362782 A1* | 12/2015 | Miao | G02F 1/13394 349/156 |

FOREIGN PATENT DOCUMENTS

| CN | 1119743 A | 4/1996 |
| CN | 103309091 A | 9/2013 |

(Continued)

OTHER PUBLICATIONS

First Office Action dated Feb. 16, 2017 in corresponding Chinese Application No. 201510369292.0.

(Continued)

*Primary Examiner* — Mariceli Santiago
(74) *Attorney, Agent, or Firm* — Nath, Goldberg & Meyer; Joshua B. Goldberg

(57) ABSTRACT

The present invention provides a liquid crystal display panel and a liquid crystal display device including the liquid crystal display panel. The liquid crystal display panel comprises a color filter substrate and an array substrate opposite to each other, a side of the color filter substrate facing the array substrate is provided with a first photo spacer, a side of the array substrate facing the color filter substrate is provided with a second photo spacer at a position corresponding to that of the first photo spacer, and an end of the first photo spacer far away from the color filter substrate and an end of the second photo spacer far away from the array substrate can shift relative to each other.

6 Claims, 2 Drawing Sheets

(56) References Cited

FOREIGN PATENT DOCUMENTS

| | | | | |
|---|---|---|---|---|
| CN | 103955096 A | | 7/2014 | |
| CN | 104035243 A | * | 9/2014 | ......... G02F 1/13394 |
| CN | 104298015 A | | 1/2015 | |
| CN | 104330924 A | | 2/2015 | |
| CN | 104536173 A | | 4/2015 | |
| JP | 2003279997 A | * | 10/2003 | |
| JP | 200477860 | | 3/2004 | |
| JP | 200477860 A | | 3/2004 | |
| KR | 1020050023967 A | | 3/2005 | |

OTHER PUBLICATIONS

The Third Office Action dated Nov. 24, 2017 corresponding to Chinese application No. 201510369292.0.
The Fourth Office Action dated Jan. 19, 2018 corresponding to Chinese application No. 201510369292.0.

\* cited by examiner

LIQUID CRYSTAL DISPLAY PANEL AND LIQUID CRYSTAL DISPLAY DEVICE

FIELD OF THE INVENTION

The present invention relates to the field of display technology, and particularly, relates to a liquid crystal display panel and a liquid crystal display device.

BACKGROUND OF THE INVENTION

A liquid crystal display panel requires photo spacers (PSs) for supporting a color filter substrate and an array substrate, the photo spacers are used to maintain a distance between the color filter substrate and the array substrate, so as to prevent the thickness of the liquid crystal cell from becoming abnormal.

In general, the bottom of the photo spacer is formed on a surface of the color filter substrate, and the free end thereof is in contact with a surface of the array substrate, the height of the photo spacer forms a level difference. The larger the level difference, the easier it is to affect coating of alignment liquid when forming alignment layers on the substrates (the color filter substrate and the array substrate) (that is, since the surface of the substrate is uneven, the alignment layer formed by coating the alignment liquid will accordingly become uneven, or even has defects), thereby causing light leakage and various mura defects in the display panel. Furthermore, for a curved panel, during bending a display panel from a flat surface state into a curved surface state, thicknesses of respective parts thereof become different inevitably. In other words, the bending process of the display panel may cause the photo spacer to be subjected to different external forces in areas bent to different extents. When the photo spacer is subjected to the external forces due to the bending of the display panel, the photo spacer may shift to left or right, so as to scratch and damage the alignment film at the side of the array substrate, the scratched portion of the alignment film no longer has the alignment function, and therefore, liquid crystals corresponding to the portion can hardly align in a required alignment direction, which causes disorder arrangement of the liquid crystal molecules corresponding to the portion, thereby resulting in light leakage. FIG. 1 is a schematic diagram illustrating a case where light leakage occurs due to a portion of the alignment film 3 on the array substrate 2 corresponding to the G pixel that scratched by the photo spacer. When a R pixel in the color filter substrate 1 is lit up, in a normal case, the color filter layer corresponding to the G pixel cannot transmit light, however, since the portion of the alignment film 3 corresponding to the G pixel is scratched, green light leaks at a position of the color filter layer corresponding to the scratched portion, thus resulting in light leakage in the display panel. In addition, even during the modularized process performed on the display panel, if the display panel is bent due to mechanical failure, the alignment film 3 may be damaged to cause light leakage in the display panel.

In the prior art, there is no effective solution to solve the problem of light leakage and various mura defects in the display panel due to uneven or defective alignment film caused by a level difference formed by the photo spacer. Moreover, in the prior art, in one solution for solving the problem of light leakage in the display panel due to damage of the alignment film caused by the photo spacer: photo spacers having different heights are used at different positions of the display panel, however, even with this structure, the photo spacer may still come into contact with the alignment film when the display panel is bent, and cannot prevent the photo spacer from scratching the alignment film when the display panel is bent.

It can be seen that, designing a liquid crystal display panel free of light leakage and various mura defects has become a technical problem to be solved urgently.

SUMMARY OF THE INVENTION

In view of the above-described shortcomings presented in the prior art, an object of the present invention is to provide a liquid crystal display panel and a liquid crystal display device including the liquid crystal display panel. In the liquid crystal display panel and the liquid crystal display device, with the photo spacers which are opposite to each other and can shift relative to each other, a level difference formed by the photo spacer is reduced, and the photo spacer is less likely to scratch the alignment film, thereby preventing light leakage and various mura defects.

In order to achieve the above object, a technical solution provided by the present invention is to provide a liquid crystal display panel, which comprises a color filter substrate and an array substrate opposite to each other, a side of the color filter substrate facing the array substrate is provided thereon with a first photo spacer, a side of the array substrate facing the color filter substrate is provided thereon with a second photo spacer at a position corresponding to that of the first photo spacer, and an end of the first photo spacer far away from the color filter substrate and an end of the second photo spacer far away from the array substrate are capable of shifting relative to each other.

Preferably, the sum of heights of the first photo spacer and the second photo spacer is equal to a distance between the color filter substrate and the array substrate.

Preferably, when the liquid crystal display panel is in a flat surface state, vertical central axes of the first photo spacer and the second photo spacer are in the same line.

Preferably, the first photo spacer and the second photo spacer have truncated cone structures.

Preferably, the end of the first photo spacer far away from the color filter substrate and the end of the second photo spacer far away from the array substrate are fitted to each other.

Preferably, an cross-sectional area of the end of the second photo spacer far away from the array substrate is larger than that of the end of the first photo spacer far away from the color filter substrate, the end of the second photo spacer far away from the array substrate is set to be a recessed structure, and the end of the first photo spacer far away from the color filter substrate is fitted in the recessed structure.

Preferably, a mesh-shaped black matrix is provided in the color filter substrate, the first photo spacer and the second photo spacer are located in a region corresponding to the black matrix.

Preferably, alignment layers are provided on the color filter substrate and the first photo spacer, and on the array substrate and the second photo spacer, respectively.

Preferably, both the array substrate and the color filter substrate are bendable, and in a bent state, the color filter substrate is positioned in an inner concave side of the array substrate.

The present invention further provides a liquid crystal display device comprising the above-described liquid crystal display panel.

The present invention has the beneficial effects as follows: with the photo spacers opposite to each other and capable of shifting relative to each other, a level difference formed by the photo spacer is reduced, and the photo spacer is less likely to scratch the alignment film, thereby preventing light leakage and various mura defects are; meanwhile, the bottom size of the photo spacer is further reduced while ensuring good securing effect, thus the black matrix has a reduced shading area, and an aperture ratio is increased, so as to further realize a high resolution display.

REFERENCE NUMERALS

1—color filter substrate;
2—array substrate;
3—alignment film;
4—liquid crystal layer;
11—color filter layer;
21—pixel electrode;
51—first photo spacer;
52—second photo spacer.

DETAILED DESCRIPTION OF THE EMBODIMENTS

To provide better understanding of the technical solution of the present invention for those skilled in the art, a liquid crystal display panel and a liquid crystal display device provided by the present invention will be described in detail below with reference to the accompanying drawings and specific embodiments.

First Embodiment

The present embodiment provides a liquid crystal display panel, which can effectively solve the problems of light leakage and various mura defects of the liquid crystal display panel in the prior art by improving photo spacers.

Figure 1:
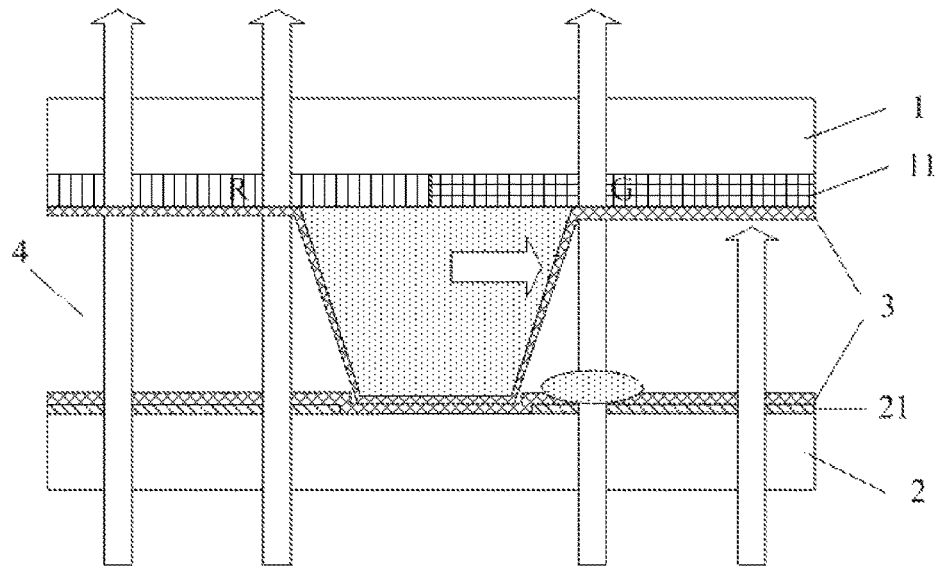
FIG. 1 is a schematic diagram illustrating a case where light leakage occurs due to a scratched alignment film in the prior art.
Figure 2:
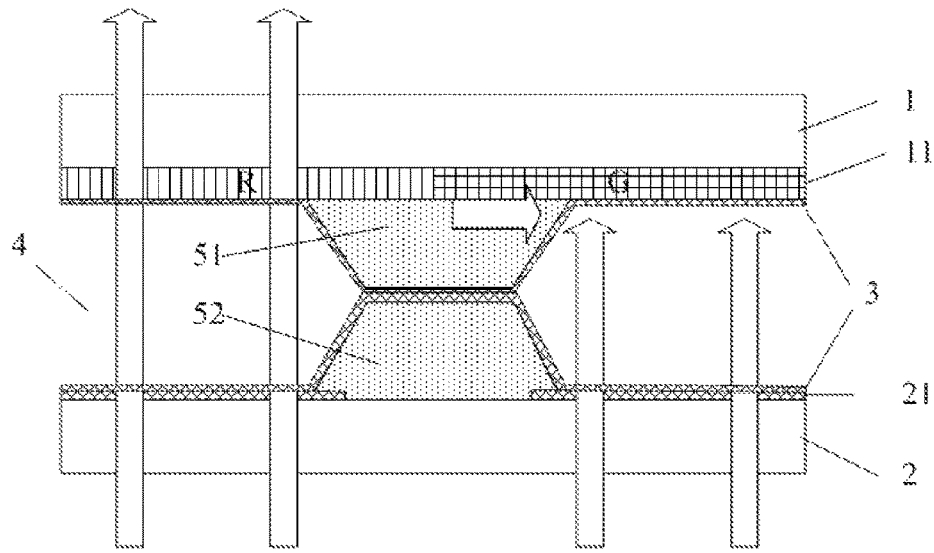
FIG. 2 is a schematic structure diagram of a liquid crystal display panel of a first embodiment of the present invention.

As shown in FIG. 2, the liquid crystal display panel of the present embodiment includes a color filter substrate 1 and an array substrate 2 opposite to each other, a side of the color filter substrate 1 facing the array substrate 2 is provided thereon with a first photo spacer 51, a side of the array substrate 2 facing the color filter substrate 1 is provided thereon with a second photo spacer 52 at a position corresponding to that of the first photo spacer 51, and an end of the first photo spacer 51 far away from the color filter substrate 1 and an end of the second photo spacer 52 far away from the array substrate 2 can shift relative to each other. The first photo spacer 51 and the second photo spacer 52 brace between the color filter substrate 1 and the array substrate 2, so as to form a liquid crystal cell, in which a liquid crystal layer 4 is formed.

In the liquid crystal display panel of the present embodiment, the array substrate 2 and the color filter substrate 1 both can be bent, and in a bent state, the color filter substrate 1 is positioned at an inner concave side of the array substrate 2. In the present embodiment, the photo spacer is divided into two parts that are respectively provided on the color filter substrate 1 and the array substrate 2, in this way, when the liquid crystal display panel is bent, although the first photo spacer 51 and the second photo spacer 52 may shift relative to each other, due to the ends thereof have certain cross-sectional areas, the free ends of the first photo spacer 51 and the second photo spacer 52 can still overlap with and butt against each other to realize alignment, in a normal curvature range for a curved display, thereby a normal thickness of the liquid crystal cell can be maintained. Moreover, in this way, a height difference between the free end and the bottom of each of the first photo spacer 51 and the second photo spacer 52 forms a level difference, and as compared with the prior art, the level differences formed by the first photo spacer 51 and the second photo spacer 52 in the present embodiment is greatly reduced, which ensures the yield of the alignment layer, prevents alignment deviation of the alignment layer during alignment, and avoids light leakage and various mura defects.

Preferably, the heights of the first photo spacer 51 and the second photo spacer 52 match with the height of the liquid crystal cell, that is, the sum of the heights of the first photo spacer 51 and the second photo spacer 52 is equal to the distance between the color filter substrate 1 and the array substrate 2. Here, the height of the first photo spacer 51 provided on the color filter substrate 1 and the height of the second photo spacer 52 provided on the array substrate 2 may be flexibly set to be different as required, as long as the sum of the height of the second photo spacer 52 provided on the array substrate 2 and the height of the first photo spacer 51 provided on the color filter substrate 1 is equal to the height of the liquid crystal cell. In an actual process, for example, the height of the second photo spacer 52 on the array substrate 2 may be smaller than that of the first photo spacer 51 on the color filter substrate 1.

Further preferably, when the liquid crystal display panel is in a flat surface state, the vertical central axis of the first photo spacer 51 and the vertical central axis of the second photo spacer 52 are in the same line, so as to ensure that the first photo spacer 51 completely overlaps with the second photo spacer 52 when the liquid crystal display panel is in a flat surface state.

As shown in FIG. 2, in the liquid crystal display panel of the present embodiment, the first photo spacer 51 and the second photo spacer 52 have truncated cone structures. However, for a better support, the end of the first photo spacer 51 far away from the color filter substrate 1 (that is, the top of the first photo spacer 51) and the end of the second photo spacer 52 far away from the array substrate 2 (that is, the top of the second photo spacer 52) may be fitted to each other. For example, the cross-sectional area of the end of the second photo spacer 52 far away from the array substrate 2 may be larger than that of the end of the first photo spacer 51 far away from the color filter substrate 1, the end of the second photo spacer 52 far away from the array substrate 2 may be formed as a recessed structure, and the end of the first photo spacer 51 far away from the color filter substrate 1 may be fitted into the recessed structure.

In the liquid crystal display panel of the present embodiment, a mesh-shaped black matrix (not illustrated in FIG. 2) is provided in the color filter substrate 1, and the first photo spacer 51 and the second photo spacer 52 are located in a region corresponding to the black matrix. By providing a black matrix, light leakage in the liquid crystal display panel can further be prevented.

In order to realize initial orientation of liquid crystal molecules, alignment films 3 are respectively provided on the color filter substrate 1 and the first photo spacer 51, and on the array substrate 2 and the second photo spacer 52. Since the first photo spacer 51 and the second photo spacer 52 are provided separately, and the free ends of the first photo spacer 51 and the second photo spacer 52 are in contact with each other, when the liquid crystal display panel is in a bent state, the first photo spacer 51 and the second photo spacer 52 to which relative shift occurs have no influence on the alignment layers on the color filter substrate 1 and the array substrate 2, thereby ensuring the performance of the liquid crystal display panel in a bent state.

For the array substrate 2 provided with a resin layer (not illustrated in FIG. 2), the second photo spacer 52 may be provided in a region corresponding to a via hole provided in the resin layer, so as to compensate a level difference resulting from the via hole of the resin layer, and reduce mura defects caused by the level difference formed by the photo spacer on the array substrate 2.

A fabricating process of a liquid crystal display panel in the present embodiment includes steps as follows:

(1) forming a black matrix in a color filter substrate 1, forming a color filter layer 11, forming a protection layer (not illustrated in FIG. 2), and forming a first photo spacer 51, wherein the height of the formed first photo spacer 51 is less than the thickness of a liquid crystal cell;

(2) forming an array substrate 2, and forming a second photo spacer 52 on a pixel electrode 21 of the array substrate 2, wherein the position of the second photo spacer 52 is opposite to that of the first photo spacer 51, and the sum of the height of the second photo spacer 52 and the height of the first photo spacer 51 is equal to the thickness of the liquid crystal cell;

(3) forming alignment films 3 on the color filter substrate 1 and the array substrate 2, respectively; and (4) aligning and assembling the color filter substrate 1 and the array substrate 2, and then performing other processes such as cutting, etc.

It should be understood that the fabricating process of a liquid crystal display panel in the present embodiment is only exemplary and not intended to limit the present invention, the steps for fabricating conventional layer structures other than the photo spacers of the color filter substrate 1 and the array substrate 2 may be performed in advance, and then the steps for forming the separated photo spacers may be performed, such that the sum of the heights of the first photo spacer 51 and the second photo spacer 52 separately formed match with the thickness of the liquid crystal cell.

In the liquid crystal display panel of the present embodiment, by separating the photo spacer into two parts respectively formed on the color filter substrate 1 and the array substrate 2, and causing the heights of the separated photo spacers to match with the thickness of the liquid crystal cell, the support function of the photo spacers is ensured when the liquid crystal display panel is bent, moreover, when the separated photo spacers shift relative to each other, only the alignment films on the opposing tops of the first photo spacer 51 and the second photo spacer 52 will be scratched (in fact, this part of alignment film has no influence on the liquid crystal alignment), and the alignment film on the color filter substrate 1 or the array substrate 2 will not be scratched, and therefore, the alignment film 3 is effectively prevented from being damaged by the free ends of the photo spacers when they shift relative to each other, thereby reducing the occurrence of light leakage; meanwhile, since the height of the photo spacer is reduced, and the level difference between the photo spacer and its peripheries is reduced, various mura defects resulting from the level difference is reduced as well; in addition, the setting manner of the photo spacers in the liquid crystal display panel of the present embodiment not only prevents the free end of the photo spacer from scratching the alignment film, but also allows the separated designed photo spacer to have a bottom size less than that of the single photo spacer in the prior art with the same support function, thus the black matrix may have a reduced blocking area, and an aperture ratio is increased, so as to further realize a high resolution display.

Second Embodiment

The present embodiment provides a liquid crystal display panel, in which, an end of the first photo spacer 51 far away from the color filter substrate 1 (that is, the top of the first photo spacer 51) and an end of the second photo spacer 52 far away from the array substrate 2 (that is, the top of the second photo spacer 52) are fitted to each other to realize a higher stability, as compared with the first embodiment.

Figure 3:
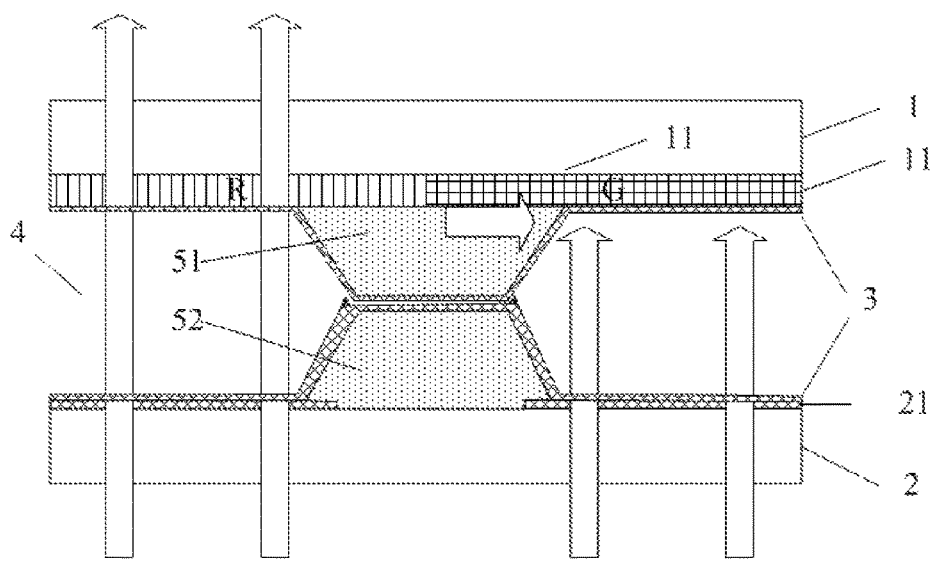
FIG. 3 is a schematic structure diagram of a liquid crystal display panel of a second embodiment of the present invention.

As shown in FIG. 3, the first photo spacer 51 and the second photo spacer 52 both have truncated cone structures. The end of the first photo spacer 51 far away from the color filter substrate 1 and the end of the second photo spacer 52 far away from the array substrate 2 are fitted to each other. Specifically, the cross-sectional area of the end of the second photo spacer 52 far away from the array substrate 2 is larger than that of the end of the first photo spacer 51 far away from the color filter substrate 1, the end of the second photo spacer 52 far away from the array substrate 2 is formed as a recessed structure, and the end of the first photo spacer 51 far away from the color filter substrate 1 is fitted in the recessed structure. In the present embodiment, the opposite photo spacers are fitted to each other, in this way, when a relative shift occurs, the recessed top of the second photo spacer 52 can cause the top of the first photo spacer 51 to move freely therein and not to slide out therefrom easily to detach from each other, thus, it is ensured that the photo spacers can stably support and secure the liquid crystal cell, and excessive shift between the photo spacers when the liquid crystal display panel is bent can be effectively prevented.

In an practical application, the fitting design of the top of the first photo spacer 51 and the top of the second photo spacer 52 may be flexibly adjusted according to actual conditions, such as the pre-stress of the liquid crystal display panel, the application situation of the liquid crystal display panel, and the like, and will not described in detail herein. As compared with the liquid crystal display panel in FIG. 2, in the liquid crystal display panel in FIG. 3, the top of the first photo spacer 51 and the top of the second photo spacer 52 are fitted to each other to realize a higher stability.

In the liquid crystal display panel in the present embodiment, with the photo spacers which are opposite to each other, can be fitted to each other and can shift relative to each other, the photo spacer is less likely to scratch the alignment film 3, and the level difference between the photo spacer and its peripheries is reduced, thereby preventing light leakage and various mura defects; meanwhile, the bottom size of the photo spacer can be reduced while ensuring good securing effect, thus the blocking area of the black matrix is reduced, and the aperture ratio is increased, so as to further realize a high resolution display.

Third Embodiment

The present embodiment provides a liquid crystal display device comprising the liquid crystal display panel in the first embodiment or the second embodiment.

The display device may be any product or component having a display function, such as electronic paper, a mobile phone, a tablet computer, a television, a display, a notebook computer, a digital photo frame, a navigator, etc.

Since the liquid crystal display device adopts the above described liquid crystal display panel substantially free of light leakage and mura defects, a better display effect is realized.

It could be understood that the above embodiments are exemplary embodiments used for describing the principle of the present invention only, but the present invention is not limited thereto. For those skilled in the art, various variations and modifications may be made without departing from the spirit and substance of the present invention, and these variations and modifications are considered as falling into the protection scope of the present invention.

The invention claimed is:

1. A liquid crystal display panel, comprising a color filter substrate and an array substrate opposite to each other, wherein a side of the color filter substrate facing the array substrate is provided thereon with a first photo spacer, a side of the array substrate facing the color filter substrate is provided thereon with a second photo spacer at a position corresponding to that of the first photo spacer, and an end of the first photo spacer far away from the color filter substrate and an end of the second photo spacer far away from the array substrate are capable of shifting relative to each other, wherein the first photo spacer and the second photo spacer have truncated cone structures, the end of the first photo spacer far away from the color filter substrate and the end of the second photo spacer far away from the array substrate are fitted to each other and wherein a surface area of the end of the second photo spacer far away from the array substrate is larger than that of the end of the first photo spacer far away from the color filter substrate, wherein alignment layers are provided on the color filter substrate and the first photo spacer, and on the array substrate and the second photo spacer, respectively, and wherein a recessed structure is formed on a top surface of the alignment layer provided on the end of the second photo spacer far away from the array substrate by varying a thickness of the alignment layer, and the end of the first photo spacer far away from the color filter substrate is fitted in the recessed structure.

2. The liquid crystal display panel according to claim 1, wherein the sum of heights of the first photo spacer and the second photo spacer is equal to a distance between the color filter substrate and the array substrate.

3. The liquid crystal display panel according to claim 1, wherein, when the liquid crystal display panel is in a flat surface state, vertical central axes of the first photo spacer and the second photo spacer are in the same line.

4. The liquid crystal display panel according to claim 1, wherein a mesh-shaped black matrix is provided in the color filter substrate, and the first photo spacer and the second photo spacer are located in a region corresponding to the black matrix.

5. The liquid crystal display panel according to claim 1, wherein both the array substrate and the color filter substrate both are bendable, and in a bent state, the color filter substrate is positioned in an inner concave side of the array substrate.

6. A liquid crystal display device, comprising the liquid crystal display panel according to claim 1.

* * * * *